US007966287B2

(12) United States Patent
Brown

(10) Patent No.: US 7,966,287 B2
(45) Date of Patent: Jun. 21, 2011

(54) APPARATUS, SYSTEM, AND METHOD FOR DYNAMIC DATABASE DRIVEN DOCUMENT SYNCHRONIZATION

(75) Inventor: Jay A. Brown, Long Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 12/121,583

(22) Filed: May 15, 2008

(65) Prior Publication Data

US 2009/0287746 A1 Nov. 19, 2009

(51) Int. Cl.
*G06F 17/00* (2006.01)
*G06F 15/16* (2006.01)

(52) U.S. Cl. .......................... 707/625; 707/634; 707/665

(58) Field of Classification Search .................. 707/610, 707/625, 634, 665, 999.01–999.206; 1/1; 709/248, 217; 715/755
See application file for complete search history.

(56) References Cited

U.S. PATENT DOCUMENTS

| 6,295,541 | B1 * | 9/2001 | Bodnar et al. ................... 1/1 |
| 7,219,304 | B1 * | 5/2007 | Kraenzel et al. ............. 715/755 |
| 2001/0052006 | A1 | 12/2001 | Barker et al. |
| 2002/0038364 | A1 | 3/2002 | Schweitzer |
| 2002/0065950 | A1 | 5/2002 | Katz et al. |
| 2005/0027559 | A1 * | 2/2005 | Rajan et al. ..................... 705/1 |
| 2005/0262518 | A1 | 11/2005 | Kress et al. |
| 2005/0278708 | A1 | 12/2005 | Zhao et al. |
| 2006/0136933 | A1 | 6/2006 | Jensen et al. |
| 2006/0174093 | A1 | 8/2006 | Jolley et al. |
| 2006/0230026 | A1 | 10/2006 | Pereira |
| 2006/0269148 | A1 | 11/2006 | Farber et al. |
| 2009/0055508 | A1 * | 2/2009 | Amador et al. ................. 709/217 |
| 2009/0164667 | A1 * | 6/2009 | Zhang et al. ................... 709/248 |

FOREIGN PATENT DOCUMENTS

WO 02/25431 A3 3/2002

OTHER PUBLICATIONS

Zhu et al., "Pounamu: A Meta-Tool for Exploratory Domain-Specific Visual Language Tool Development", Journal of System and Software 80 (2007) 1390-1407.

* cited by examiner

*Primary Examiner* — Greta L Robinson
*Assistant Examiner* — Dennis Truong
(74) *Attorney, Agent, or Firm* — Kunzler Needham Massey & Thorpe

(57) ABSTRACT

An apparatus, system, and method are disclosed for dynamically synchronizing multiple document management systems based on customizable events and actions. An edit module edits records in a custom configuration database in response to user input, each of the records comprising a timestamp and configuration data corresponding to an event. A loader module caches the records from the custom configuration database in a memory. A polling module compares a timestamp in the memory to a timestamp in the custom configuration database at a polling interval. An update module updates a record in the memory when the timestamp of the record in the memory is older than the timestamp of a corresponding record in the custom configuration database. An execution module performs a synchronization action on a destination document management system in response to an event in a source document management system based on corresponding configuration data in the custom configuration database.

6 Claims, 3 Drawing Sheets

APPARATUS, SYSTEM, AND METHOD FOR DYNAMIC DATABASE DRIVEN DOCUMENT SYNCHRONIZATION

BACKGROUND OF THE INVENTION

1. Field of the Invention

This invention relates to document management systems and more particularly relates to synchronization of multiple document management systems.

2. Description of the Related Art

As the use of document management systems (DMSS) increases, the need to synchronize multiple DMSs is also increasing. Local corporate offices need to synchronize their smaller scale office DMSs with larger scale enterprise content management (ECM) systems. Different users of the same DMS installation often have different synchronization requirements, as do different document types, sites, libraries, and folders within a DMS.

It is often difficult or impossible for these varying document synchronization requirements to be met. Synchronizing documents from multiple DMSs is often inflexible and complicated for both DMS users and administrators. Individual event handlers must often be created and configured for each synchronization event. In addition to being complicated, the synchronization event handlers are not dynamic, and often cannot be updated by a user during runtime, or at all. In many cases, users and administrators have no direct access to the event handling or document synchronization systems of their DMS, and rely on preconfigured or default settings that were configured when their DMS was installed.

SUMMARY OF THE INVENTION

From the foregoing discussion, it should be apparent that a need exists for an apparatus, system, and method that dynamically synchronize multiple document management systems. Beneficially, such an apparatus, system, and method would also be dynamically user customizable.

The present invention has been developed in response to the present state of the art, and in particular, in response to the problems and needs in the art that have not yet been fully solved by currently available document synchronization systems. Accordingly, the present invention has been developed to provide an apparatus, system, and method for dynamically synchronizing multiple document management systems that overcome many or all of the above-discussed shortcomings in the art.

The apparatus to dynamically synchronize multiple document management systems is provided with a plurality of modules configured to functionally execute the necessary steps of dynamic document management system synchronization. These modules in the described embodiments include an edit module, a loader module, a polling module, an update module, and an execution module.

The edit module, in one embodiment, dynamically edits one or more records in a custom configuration database in response to user input. In a further embodiment, each of the one or more records comprise a custom identifier, a timestamp, a filter list, an action list, and a polling interval. The edit module, in another embodiment, updates the timestamp of the one or more records in response to the user input.

In one embodiment, the loader module caches the one or more records from the custom configuration database in a memory. In a further embodiment, each of the one or more records in the memory are indexed by the corresponding custom identifier.

The polling module, in one embodiment, compares a timestamp associated with a custom identifier in the memory to a timestamp associated with a corresponding custom identifier in the custom configuration database. In another embodiment, the polling module compares the timestamps at a polling interval associated with the custom identifier in the memory. In one embodiment, the update module updates a record in the memory in response to a determination by the polling module that the timestamp of the record in the memory is older than the timestamp of the corresponding record in the custom configuration database.

In a further embodiment, the execution module performs a synchronization action defined by an action list in the memory. The synchronization action, in another embodiment, is performed on a destination document management system in response to an event in the source document management system. In one embodiment, the event is defined by a filter list corresponding to the action list in the memory. The action list, in another embodiment, comprises an action type, a destination, a document type, and a data mapping.

A system of the present invention is also presented to dynamically synchronize multiple document management systems. The system may be embodied by a source document management system, a destination document management system, an electronic memory, a web interface, and a document synchronization module. In particular, the document synchronization module, in one embodiment, includes the modules of the apparatus presented above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
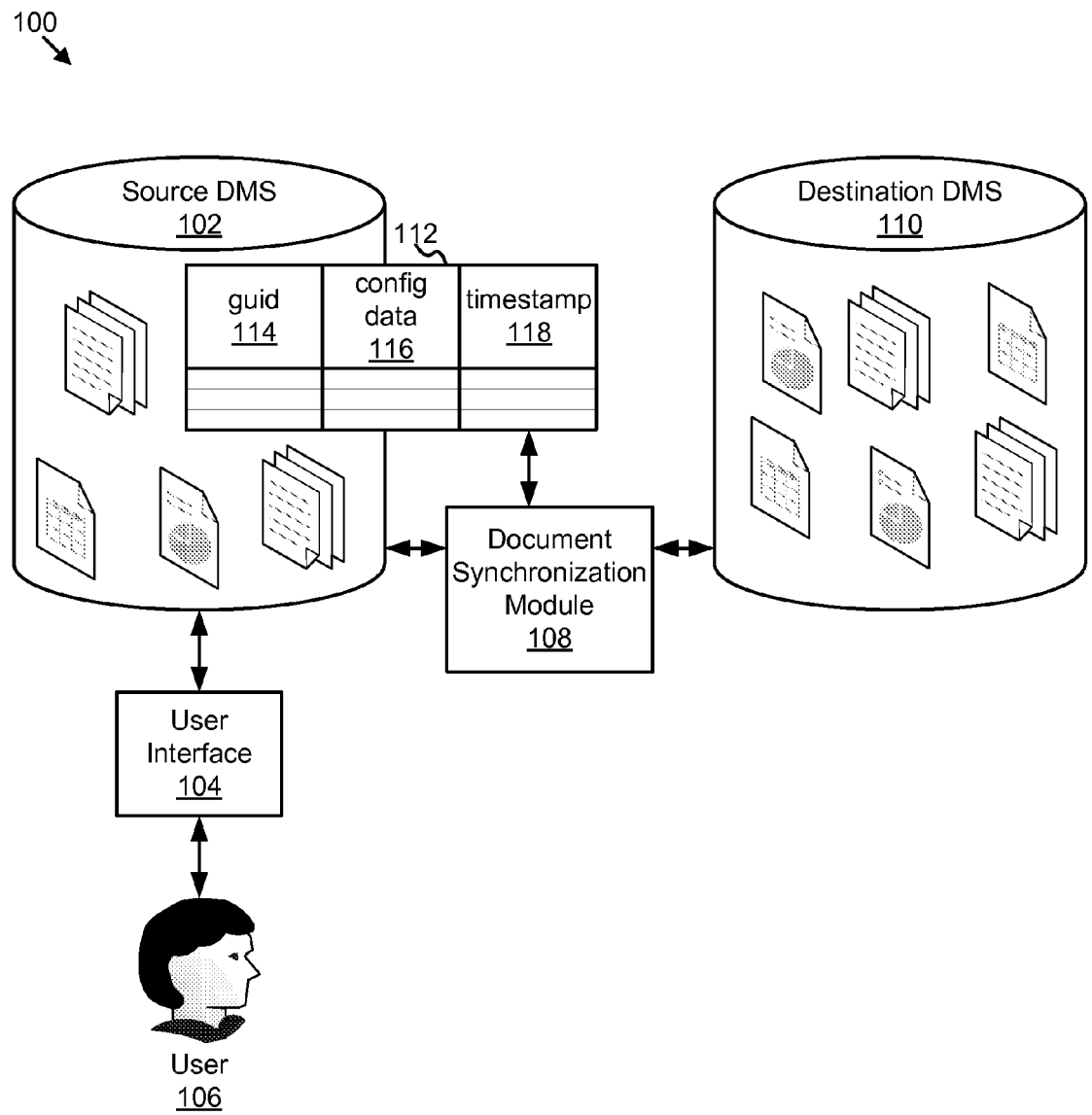
FIG. 1 is a schematic block diagram illustrating one embodiment of a dynamic database driven document synchronization system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating a signal, causing a signal to be generated, or causing execution of a program of machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a dynamic document synchronization system 100. In one embodiment, the system 100 may comprise a source document management system (DMS) 102, a user interface 104, a user 106, a document synchronization module 108, a destination DMS 110, and/or a custom configuration database 112.

In one embodiment, the source DMS 102 comprises a document repository. The source DMS 102 may create, store, index, organize, transmit, retrieve, manipulate, update, sort, and/or dispose of one or more documents, metadata, databases, and the like. Documents may comprise text files, data files, image files, audio files, video files, folders, links, pointers, or other objects that are storable or indexable by the source DMS 102. In another embodiment, the source DMS 102 may index or organize metadata corresponding to physical documents. In a further embodiment, the source DMS 102 may comprise or be a subcomponent of a content management system (CMS), an enterprise content management system (ECM), a contract lifecycle management system (CLM), another DMS, or other repository or data management systems.

In one embodiment, the source DMS 102 may provide features such as integration with applications, capturing of documents from scanning hardware, optical character recognition (OCR), document indexing, electronic document storage, querying, document retrieval, document distribution, document security, workflow management, collaboration tools, document versioning, networking tools, web tools, and other document features and tools. In one embodiment, the source DMS 102 comprises multiple sites, collections, libraries, folders, hierarchies, or the like, that may be used for organizational purposes, divided among users, or the like. Example DMSs include Alfresco, ColumbiaSoft, Documentum, FileNet P8, ImageNow, Knowledge Tree, Laserfiche, Livelink, Main//Pyrus DMS, Meridio, OpenKM, Questys Solutions, Report2Web, Saperion, SAP Netweaver, SearchExpress, SharePoint, TRIM Context, and the like. In one embodiment, the source DMS 102 comprises an office DMS, such as SharePoint, in another the source DMS 102 comprises an enterprise DMS or ECM system, such as FileNet P8. In general an office DMS is configured for fewer documents or fewer users than an enterprise DMS/ECM system. For example, an office DMS may be configured for use in a small office or small business environment, while an enterprise DMS may be configured for use in an enterprise wide environment for a large corporation or the like.

In one embodiment, the source DMS 102 comprises a custom configuration database 112. In an alternative embodiment, the custom configuration database 112 may be stored in the destination DMS 110, may be an independent database, or may be part of a separate repository or database system. The custom configuration database 112 may be directly or indirectly accessible to the document synchronization module 108. The custom configuration database 112, in one embodiment, comprises one or more records, each of the records comprising a custom identifier 114, configuration data 116, and a timestamp 118. One example embodiment of data retrieved from the custom configuration database 112 is discussed in greater detail with regard to the cached custom configuration database 216 of FIG. 2.

In one embodiment, the custom identifier 114 comprises a unique identifier, such as a Globally Unique Identifier (GUID), for a record. The custom identifier 114 of each record may be assigned sequentially, randomly, or in another manner that produces unique identifiers. The custom identifier 114 may comprise alphanumeric digits, binary digits, hexadecimal digits, or other digits compatible with the custom configuration database 112. For example, in one embodiment, the custom identifier 114 may comprise a TINYINT, a SMALLINT, a MEDIUMINT, an INT, a BIGINT, a VARCHAR, a DECIMAL, a FLOAT, a DOUBLE, a MEDIUMTEXT, or another database data type. In a further embodiment, the custom identifier 114 comprises a GUID, such as the GUID defined by the Universally Unique Identifier (UUID) standard. In one embodiment, the custom identifier 114 may comprise a 16-byte data field.

In one embodiment, the custom identifier 114 may index the records in the custom configuration database 112, and may be retrieved from the custom configuration database to index the retrieved records in a memory or other storage. The custom identifier 114, in a further embodiment, comprises a key for a generic event handler to access the configuration data 116 in the custom configuration database 112. For example, multiple instances of a single generic event handler may each access separate records in the custom configuration database 112 based on the custom identifier 114 of the record. In a further example, a generic event handler comprising a single code base is registered for each event in the custom configuration database 112, and multiple instances of the single generic event handler are simultaneously executing, each instance keyed to a different custom identifier 114.

In one embodiment, the configuration data 116 comprises custom event data and action data for a generic event handler. In a further embodiment, the custom event data defines an event, and the action data defines a synchronization action corresponding to the event. In one embodiment, the custom event data comprises a markup language based filter list. The filter list may comprise data such as a list of properties and values, and a list of Boolean comparators defining relationships between the various properties and values. The properties may comprise document metadata, other document properties, system properties, and the like. In one embodiment, the markup language comprises extensible markup language (XML), and the filter list is formatted based on an XML schema.

In one embodiment, the action data comprises a markup language based action list. The action list may comprise data such as an action type, a destination, a document type, a data mapping, and the like. Action types may include such actions as move, copy, delete, copy with stub, and other synchronization actions that can be performed on one or more documents in the source DMS 102. In one embodiment, the markup language comprises XML, and the action list is formatted based on an XML schema.

The destination, in one embodiment, may comprise a location in the destination DMS 110. The destination may comprise a site, collection, library, folder, hierarchy, or the like in the destination DMS 110. In one embodiment, the document type may be a format type of a document, a business type of a document, or another document type. The data mapping, in one embodiment, maps document metadata, properties, and the like from documents in the source DMS 102 to their destination in the destination DMS 110. For example, in one embodiment, database fields, metadata, document properties, document types, and the like in the source DMS 102 may have different names, different data types, or other differences from corresponding database fields, metadata, document properties, document types, and the like in the destination DMS 110, and the data mapping maps or coordinates the differences.

In another embodiment, the configuration data 116 may further comprise a polling interval. The polling interval may comprise a period, in response to which the document synchronization module 108 will check the custom configuration database 112 for changes in a record. In one embodiment, the timestamp 118 comprises an indicator of when a record was most recently changed. The timestamp 118 may have a time based format, for example, yyyy-mm-dd hh:mm:ss, or another database timestamp format. In one embodiment, the document synchronization module 108 compares a cached timestamp with the timestamp 118 at the polling interval to determine whether changes have been made to a record in the custom configuration database 112.

In one embodiment, the user interface 104 provides access to the custom configuration database 112. The user interface 104 may access the custom configuration database 112 through the source DMS 102, may access the custom configuration database 112 directly, or may otherwise access the custom configuration database 112. The user interface 104 may be collocated on a computer system with the custom configuration database 112, or it may be in communication with the custom configuration database 112 over a network. The user interface 104 may comprise a text interface, a graphical user interface (GUI), a web or other network interface, or the like. In one embodiment, the user interface 104 may be available to the user 106 on one or more of an individual computer device, a local intranet, and the Internet. In one embodiment, the user interface 104 comprises an interface whereby the user 106 may dynamically update the custom configuration database 112, adding, editing, or deleting records. The user interface 104, in a further embodiment, may present the user 106 one or more editable forms, or present a wizard configuration tool or the like to facilitate entry of custom configuration data by the user 106. The user 106 may comprise a document owner, a DMS administrator, or another user of the system 100.

In one embodiment, the document synchronization module 108 is in communication with the source DMS 102, the custom configuration database 112, and the destination DMS 110. The document synchronization module 108 is discussed in greater detail with regard to FIG. 2. In general, the document synchronization module 108 is configured to cache data from the custom configuration database 112 in a memory, to compare a cached timestamp to the timestamp 118 at a polling interval defined by the configuration data 116, to update the cached data when the cached timestamp is older than the timestamp 118, and to execute a synchronization action in response to an event, the synchronization action and the event defined by the configuration data 116.

In one embodiment, the destination DMS 110 comprises a document repository as described above with regard to the source DMS 102. The destination DMS 110 may have substantially similar features as the source DMS 102, or may have a different feature set. In one embodiment, the source DMS 102 comprises a smaller scale office DMS, such as SharePoint and the like, and the destination DMS 102 comprises a larger scale enterprise DMS or ECM system, such as FileNet P8 and the like.

Figure 2:
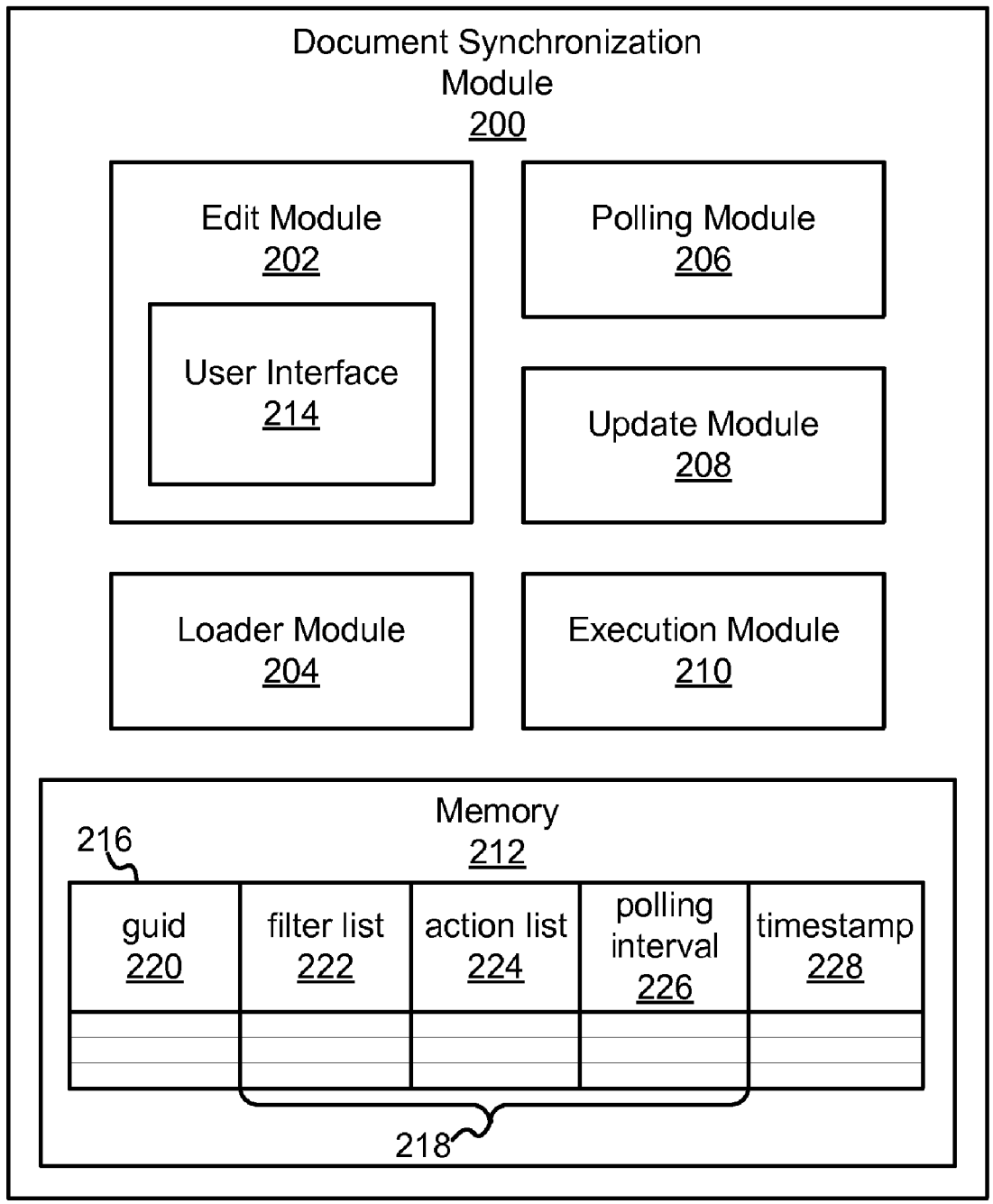
FIG. 2 is a schematic block diagram illustrating one embodiment of a document synchronization module in accordance with the present invention.

FIG. 2 depicts a document synchronization module 200. The document synchronization module 200, in one embodiment, may be substantially similar to the document synchronization module 108 of FIG. 1. In one embodiment, the document synchronization module 200 comprises an edit module 202, a loader module 204, a polling module 206, an update module 208, an execution module 210, and a memory 212.

In one embodiment, the edit module 202 is configured to dynamically edit one or more records in a custom configuration database in response to an input. The input may comprise user input, input from another module, system, or the like, or other input. In a further embodiment, each of the records comprises a custom identifier, a filter list, an action list, a polling interval, and a timestamp. The custom configuration database and the one or more records, in one embodiment, may be substantially similar to the custom configuration database 112 of FIG. 1, including the custom identifier 114, the configuration data 116, and the timestamp 118 of FIG. 1. The edit module 202, in another embodiment, may be configured to create a new record, edit an existing record, delete a record, or otherwise update a record in response to the input. The edit module 202, in a further embodiment, may be configured to update the timestamp of the one or more records in response to the input, such that the timestamp represents the time that the record was most recently edited. The edit module 202 may be configured to dynamically edit the one or more records during runtime, such that a user may edit the one or more records without stopping or restarting execution of the document synchronization module 200. In one embodiment, the edit module 202 comprises a user interface 214. The user interface 214, in one embodiment, may be substantially similar to the user interface 104 of FIG. 1.

In one embodiment, the loader module 204 is configured to cache one or more records 216 from the custom configuration database in the memory 212. In one embodiment, the loader module 204 caches a custom identifier 220, a filter list 222, an action list 224, a polling interval 226, and a timestamp 228 for each of the records 216. The custom identifier 220 indexes each of the records 216 in the memory 212.

In one embodiment, the polling module 206 compares the timestamp 228 for each of the records 216 to a corresponding timestamp in the custom configuration database at a time based on the polling interval 226 of each of the records 216. Because each of the records 216 in the memory 212 are indexed by the custom identifier 220, and each of the records in the custom configuration database are indexed by a corresponding custom identifier, the polling module 206 may locate corresponding records by matching the custom identifier 220 from the memory with a custom identifier in the custom configuration database.

In one embodiment, the update module 208 is configured to update a record in the memory 212 in response to a determination by the polling module 206 that the timestamp 228 of the record in the memory 212 is older than the timestamp of the corresponding record in the custom configuration database. The update module 208 may update the record by recopying each of the fields of the record into the memory 212 or by recopying the fields of the record that have been changed into the memory 212. An outdated timestamp 228 may denote that one or more fields of configuration data 218, including the filter list 222, the action list 224, the polling interval 226, or other fields were changed by a user.

In one embodiment, the execution module 210 is configured to perform a synchronization action defined by the action list 224 in the memory 212. The execution module 210 may perform the synchronization action on a destination DMS. The execution module 210 may perform the synchronization action in response to an event in a source DMS. In one embodiment, the event is defined by the filter list 222 of a record in the memory, and the synchronization action is defined by the action list 224 of the same record in the memory. In one embodiment, the synchronization action may comprise a move, a copy, a delete, a copy with stub, or another action.

In one embodiment, the memory 212 comprises a cache for one or more records 216 from the custom configuration database. The memory 212 may comprise an electronic, magnetic, or optical data storage that is rewritable. In one embodiment, the memory 212 comprises random access memory (RAM) such as static RAM (SRAM), dynamic RAM (DRAM), flash memory, or the like.

In one embodiment, the one or more records 216 comprise a custom identifier 220, configuration data 218, and a timestamp 228. In one embodiment the one or more records 216 are substantially similar to the records of the custom configuration database 112 of FIG. 1, including the custom identifier 114, the configuration data 116, and the timestamp 118. The configuration data 116, in one embodiment, may comprise a filter list 222, an action list 224, and a polling interval 226.

In one embodiment, the custom identifier 220 comprises a unique identifier, such as a guid, for each of the records 216 in the memory 212. In one embodiment, the custom identifier 220 may index the records 212 in the memory 212, and may correspond to similar custom identifiers in the custom configuration database. In a further embodiment, the custom identifier 220 is substantially similar to the custom identifier 114 of FIG. 1.

In one embodiment, the configuration data 218 is substantially similar to the configuration data 116 of FIG. 1. In a further embodiment, the filter list 222 defines an event, and the action list defines a synchronization action corresponding to the event. In one embodiment, the filter list 222 is formatted based on a markup language. The filter list 222 may comprise data such as a list of properties and values, and a list of Boolean comparators defining relationships between the various properties and values. The properties may comprise document metadata, other document properties, system properties, and the like. In one embodiment, the markup language comprises extensible markup language (XML), and the filter list 222 is formatted based on an XML schema.

In one embodiment, the action list 224 is formatted based on a markup language. The action list 224 may comprise data such as an action type, a destination, a document type, a data mapping, and the like. Action types may include such actions as move, copy, delete, copy with stub, and other synchronization actions that can be performed on one or more documents in a source DMS. In one embodiment, the markup language comprises XML, and the action list is formatted based on an XML schema. A move action may denote moving a document and associated metadata from a source DMS to a destination DMS. A copy action may denote copying a document and associated metadata from a source DMS to a destination DMS. A delete action may denote deleting a document and associated metadata from a source DMS. A copy with stub action may denote copying a document and associated metadata from a source DMS to a destination DMS while leaving a pointer, link, or the like to the document in the source DMS.

The destination, in one embodiment, may comprise a location in a destination DMS. The destination may comprise a site, collection, library, folder, hierarchy, or the like in the destination DMS. In one embodiment, the document type may be a format type of a document, a business type of a document, or another document type. The data mapping, in one embodiment, maps document metadata, properties, and the like from documents in the source DMS to their destination in the destination DMS. For example, in one embodiment, database fields, metadata, document properties, document types, and the like in the source DMS may have different names, different data types, or other differences from corresponding database fields, metadata, document properties, document types, and the like in the destination DMS, and the data mapping maps between or coordinates the differences.

In one embodiment, the polling interval 226 comprises a period, in response to which the polling module 206 checks the custom configuration database for changes in a record. In one embodiment, the timestamp 228 comprises an indicator of when a record was most recently changed. The timestamp 228 may have a time based format, for example, yyyy-mm-dd hh:mm:ss, or another database timestamp format. In one embodiment, the polling module 206 compares the cached timestamp 228 with a corresponding timestamp in the custom configuration database at the polling interval 226 to determine whether changes have been made to a record in the custom configuration database corresponding to the timestamp.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
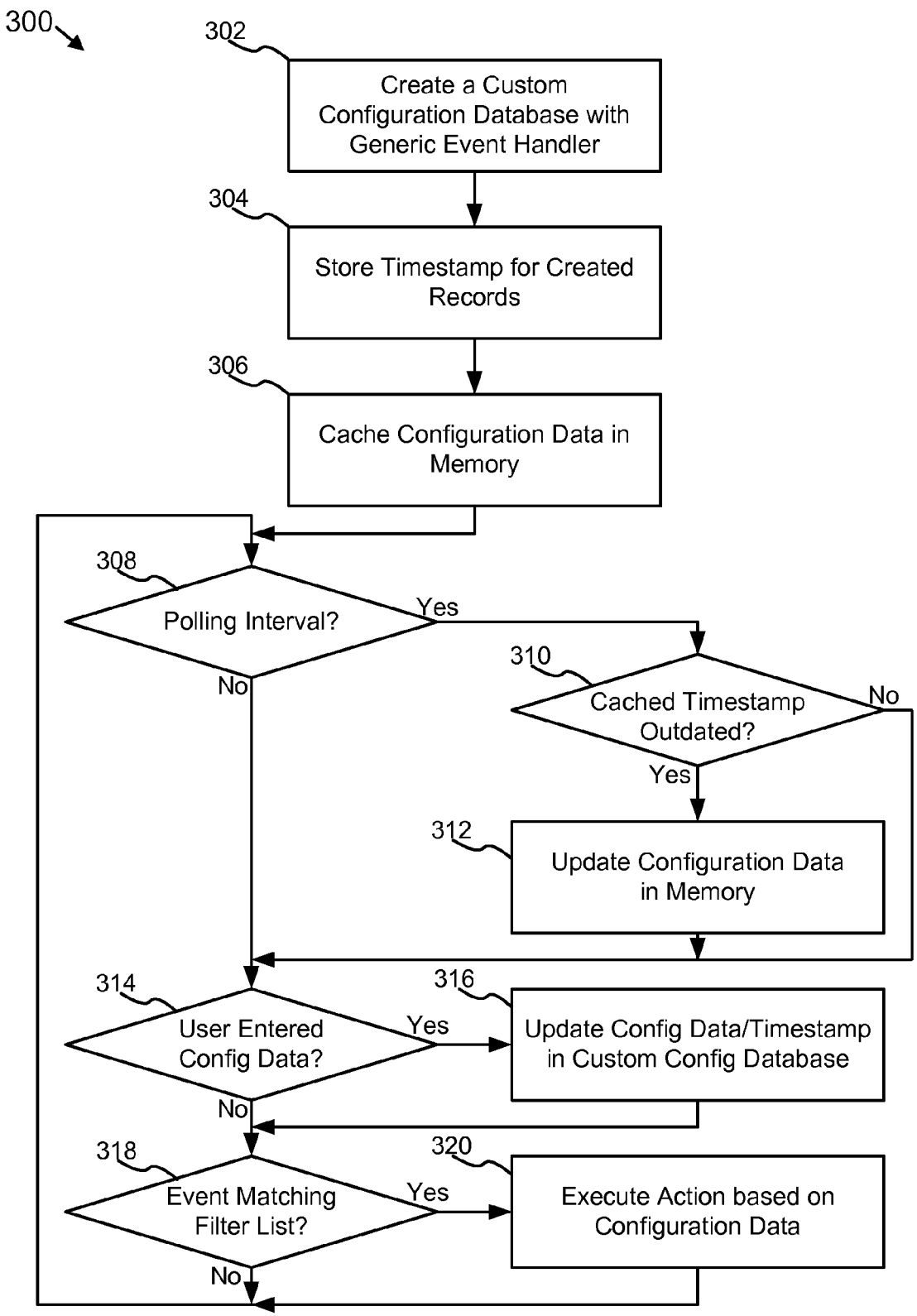
FIG. 3 is a flow-chart block diagram illustrating one embodiment of a method for dynamic database driven document synchronization in accordance with the present invention.

FIG. 3 depicts a document synchronization method 300. In one embodiment, the edit module 202 creates 302 the custom configuration database 112 in the source DMS 102. The edit module 202 may create 302 one or more default records or initial user defined records in the custom configuration database 112, and register a generic event handler for each of the created records. The edit module 202 stores 304 the timestamp 118 for each record in the custom configuration database 112.

The loader module 204 caches 306 the records from the custom configuration database 112 in the memory 212, each of the cached records 216 indexed by the custom identifier 220. The polling module 206 determines 308 whether the polling interval 226 has been reached for a record. In response to a determination 308 that the polling interval 226 has been reached, the polling module 206 determines 310 whether the timestamp 228 of the record is outdated by comparing the timestamp 228 with a corresponding timestamp 118 from the custom configuration database 112, corresponding records having the same custom identifier 114, 220 as the polling interval 226 that has been reached. In response to a determination 310 by the polling module 206 that the timestamp 228 is outdated, the update module 208 updates 312 the corresponding cached record in the memory 212.

The edit module 202 determines 314 whether the user 106 has entered configuration data. The edit module 202 updates 316 the configuration data 116 in the custom configuration database 112 and updates 316 the timestamp 118 of the updated record in response to a determination 314 that the user 106 has entered configuration data. The user 106 may enter a new record, edit an existing record, or delete a record.

The execution module 210 determines 318 whether an event matching the filter list 222 of a record has occurred in the source DMS 102. The execution module 210 may make the determination 318 that an event has occurred by polling the source DMS 102 based on the filter list 222, or by using a source DMS 102 event trigger system. In response to a determination 318 that a matching event has occurred, the execution module 210 executes 320 a synchronization action based on the action list 224 corresponding to the filter list 222 defining the event that occurred. The synchronization action may include copying one or more documents associated with the event from the source DMS 102 to the destination DMS 110, moving the one or more documents from the source DMS 102 to the destination DMS 110, deleting one or more documents from the destination DMS 110, or moving the one or more documents from the source DMS 102 to the destination DMS 110 leaving a stub, link, or pointer to the one or more documents in the source DMS 102. The method 300 may return to step 308.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to dynamically synchronize multiple document management systems based on user customizable events and actions, the apparatus comprising:
   an edit module configured to dynamically edit one or more configuration records in a custom configuration database in response to user input, the one or more configuration records defining configuration data for synchronizing a source document management system and a destination document management system, each of the one or more configuration records comprising a custom identifier unique to the configuration record, a timestamp identifying a most recent time at which the configuration record was edited, a filter list defining one or more document events in the source document management system, an action list defining a synchronization action to perform on the destination document management system in response to the one or more document events of the filter list, and a polling interval, the edit module further configured to update the timestamps of the one or more configuration records in response to editing the one or more configuration records;
   a loader module configured to cache the one or more configuration records from the custom configuration database in a memory, each of the one or more configuration records indexed by the custom identifier corresponding to the configuration record;
   a polling module configured to compare the timestamps of the one or more configuration records cached in the memory to the timestamps of the one or more configuration records in the custom configuration database, the polling module configured to compare the timestamps at the polling intervals associated with the one or more configuration records cached in the memory;
   an update module configured to update a stale configuration record from the one or more configuration records cached in the memory in response to a determination by the polling module that the timestamp of the stale configuration record in the memory is older than the timestamp of the corresponding configuration record in the custom configuration database; and an execution module configured to perform the synchronization action defined by the action list of a triggered record from the one or more configuration records in the memory, the synchronization action performed on the destination document management system in response to a document event in the source document management system triggering the triggered record, the document event defined by the filter list corresponding to the action list of the triggered record in the memory, the action list comprising an action type, a destination, a document type, and a data mapping for the synchronization action;

wherein the edit module, the loader module, the polling module, the update module, and the execution module comprise one or more of logic hardware and executable code, the executable code stored on a non-transitory computer readable storage medium.

2. The apparatus of claim 1, wherein the action type is selected from the group consisting of move, copy, delete, and copy with stub.

3. The apparatus of claim 1, wherein the source document management system comprises an office document management system and the destination document management system comprises an enterprise document management system.

4. The apparatus of claim 1, wherein the edit module receives the user input from a web interface.

5. A system to dynamically synchronize multiple document management systems based on user customizable events and actions, the system comprising:

a small scale office document management system comprising a custom configuration database;

a large scale enterprise document management system configured for use by more users than the small scale office document management system is configured for, and further configured to manage at least one order of magnitude more documents than the small scale office document management system is configured to manage;

an electronic memory;

a web interface configured to allow a user to edit one or more configuration records in the custom configuration database, the one or more configuration records defining configuration data for synchronizing the small scale office document management system and the large scale enterprise document management system, each of the one or more configuration records comprising a custom identifier unique to the configuration record, a timestamp identifying a most recent time at which the configuration record was edited, a filter list defining one or more document events in the small scale office document management system, an action list defining a synchronization action to perform on the large scale enterprise document management system in response to the one or more document events of the filter list, and a polling interval, the web interface further configured to update the timestamps of the one or more configuration records in response to an edit of the one or more configuration records by the user;

a document synchronization module in communication with the small scale office document management system, the large scale enterprise document management system, and the electronic memory, the document synchronization module comprising:

a loader module configured to cache the one or more configuration records from the custom configuration database in the electronic memory, each of the one or more configuration records indexed by the custom identifier corresponding to the configuration record;

a polling module configured to compare the timestamps of the one or more configuration records cached in the electronic memory to the timestamps of the one or more configuration records in the custom configuration database, the polling module configured to compare the timestamps at the polling interval associated with the one or more configuration records cached in the electronic memory;

an update module configured to update a stale configuration record from the one or more configuration records cached in the electronic memory in response to a determination by the polling module that the timestamp of the stale configuration record in the electronic memory is older than the timestamp of the corresponding configuration record in the custom configuration database; and an execution module configured to perform the synchronization action defined by the action list of a triggered record from the one or more configuration records in the electronic memory, the synchronization action performed on the large scale enterprise document management system in response to a document event in the small scale office document management system triggering the triggered record, the document event defined by the filter list corresponding to the action list of the triggered record in the electronic memory, the action list comprising an action type, a destination, a document type, and a data mapping for the synchronization action.

6. The apparatus of claim 5, wherein the small scale office document management system comprises a Sharepoint document management system and the large scale enterprise document management system comprises a Filenet P8 document management system.

* * * * *